United States Patent Office 2,786,799
Patented Mar. 26, 1957

2,786,799

PROCESS FOR PRODUCING OF α-KETOGLUTARIC ACID BY BACTERIA OF THE COLI-AEROGENES GROUP

Hideo Katagiri and Kazutami Imai, Kyoto City, and Tatsurokuro Tochikura, Otokuni-gun, Japan No Drawing. Application March 1, 1954,
Serial No. 413,448

Claims priority, application Japan March 2, 1953

6 Claims. (Cl. 195—48)

This invention relates to a process for producing α-ketoglutaric acid by fermentation, which is carried out under aerobic condition, wherein the bacteria of the genus Escherichia, the genus Aerobacter or the genus Proteus is inoculated into a cultural medium with or without adding of vitamin $B_1$, or similar compounds. The object of the invention is to obtain a high yield of α-ketoglutaric acid.

The bacteria of the genus Escherichia and the genus Aerobacter which are gram-negative rod-shaped cells without endospores, ferment glucose and lactose, such as species *Escherichia coli*, *Escherichia freudii*, *Escherichia intermedium*, *Aerobacter aerogenes* or *Aerobacter cloacae*, and those of the genus Proteus which ferment glucose and not lactose, such species as *Proteus vulgaris*, *Proteus mirabilis* and *Proteus rettgeri* belong mainly to intestinal microorganisms. Therefore these bacteria have been hitherto cultivated under anaerobic condition (without agitation), in which lactic acid, alcohol, acetic acid, $CO_2$ and hydrogen gas were found as their fermentation products, and thus no one has ever recognized the production of α-ketoglutaric acid with those bacteria.

As a result of various investigations it has been found that by utilization of these bacteria, viz., the bacteria cultivated under aerobic conditions (aerating, shaking or swinging cultures) by replacement of conventional an aerobic cultivation (without agitation) remarkable changes took place in the ultimate fermentation products with a large quantity of α-ketoglutaric acid produced.

According to this invention the process therein is possible for practice on an industrial scale. To explain in detail, when one or more than two strains of the bacteria mentioned above are inoculated in a cultural medium containing, as a source of carbon, saccharide such as glucose and maltose, or organic acid such as acetic and succinic acids, or a certain mixture of these sugars and of these organic acids, and, as a source of nitrogen, natural substance such as soy bean cake, fish meal and bouillon, or organic nitrogen compound such as peptone, amino acid and casein, or inorganic nitrogen compound such as ammonium sulphate, ammonium nitrate and ammonium phosphate, or a certain mixture of those substances and compounds, and then cultivated aerobically, keeping the medium near neutral, α-ketoglutaric acid can be obtained. However, incidental formation of pyruvic acid may be observed as a by-product, which has a tendency to impede crystallization of α-ketoglutarates (salts of lime, etc.). If the cultivation is carried out in the nutrient medium in which vitamin $B_1$ (cf. Examples 2 and 3) or allithiamine (thiamineallyldisulfide) (cf. Example 4) or vitamin $B_1$ compounds including allithiamine homologue (cf. Example 5) or a certain mixture of these vitamin $B_1$ derivatives previously added, at the rate of 5–400 mg. of the converted vitamin $B_1$ to 100 litre medium, formation of pyruvic acid will diminish considerably, and no ill-effect on production of α-ketoglutaric acid is observed, which means vitamin $B_1$ derivative plays on economical advantage.

The present invention opens a new field to employ the bacteria of the genus Escherichia, the genus Aerobacter and the genus Proteus hitherto having no industrial usage, and also to isolate α-ketoglutaric acid easily in the form of salt (lime etc.) from the fermented liquid by condensing the liquid to a little extent or simply by cooling it.

Examples

1. *Escherichia coli* is inoculated in a synthetic medium containing 2–6.8% glucose, 0.05–0.1% ammonium phosphate and 2–3% calcium carbonate, and kept in a shaking culture at 25–40° C. for three to seven days. The fermented liquid containing calcium salt of α-ketoglutaric acid is condensed by evaporation to a half volume. By this treatment, 280–2384 mg. α-ketoglutaric acid can be obtained from 100 cc. liquid.

It is worth to note that, when ordinary cultivations without agitation instead of the shaking culture were applied to this case, under the same conditions of composition of the medium, temperature and of the period of cultivation, it would produce no α-ketoglutaric acid but merely lactic acid, alcohol, acetic acid etc.

2. To the 2% glucose medium used in Example 1 (yield: 280 mg. α-ketoglutaric acid from 100 cc.), vitamin $B_1$ is added and then handled in the same way as in the above. The production of pyruvic acid is diminished remarkably as is shown in the following table.

| Addition of vitamin $B_1$ | No addition | Addition of $B_1$ (mg. in 100 cc.) | |
|---|---|---|---|
| | | 5 | 100 |
| Production: | | | |
| Production of α-ketoglutaric acid (mg. in 100 cc.) | 280.0 | 349.2 | 334.4 |
| Production of pyruvic acid (mg. in 100 cc.) | 792.0 | Trace | Trace |

3. With the same synthetic medium shown in Example 2 in which *Escherichia coli* was replaced by *Proteus vulgaris*, α-ketoglutaric acid was easily obtained with yield of 370 mg. from 100 cc., when vitamin $B_1$ (10 mg. in 100 cc.) was added previously to the medium.

4. In the medium containing *Escherichia coli* as in Example 2, allithiamine (thiamine allyl disulfide)

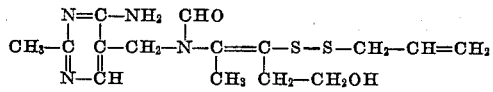

was used in place of vitamin $B_1$. It resulted in a decrease of pyruvic acid as shown in the following table.

| Addition of allithiamine (T. A. D.) | No addition | Addition of T. A. D. (mg. in 100 litre) | |
|---|---|---|---|
| | | 15 | 20 |
| Production: | | | |
| Production of α-ketoglutaric acid (mg. in 100 cc.) | 333.9 | 288.4 | 273.2 |
| Production of pyruvic acid (mg. in 100 cc.) | 760.5 | Trace | Trace |

5. To the medium of Example 4, thiaminepropyldisulfide (T. P. D.)

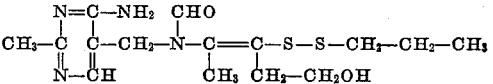

an allithiamine homologue, was added in place of allithiamine. This also revealed decrease of pyruvic acid-production and facilitated manufacture of α-ketoglutaric acid as clearly shown in the following table.

| Addition of T. P. D. | No addition | Addition of T. P. D. (mg. in 100 litre) | |
|---|---|---|---|
| | | 10 | 40 |
| Production: | | | |
| Production of α-keto glutaric acid (mg. in 100 cc.) | 210.0 | 235.5 | 300.0 |
| Production of pyruvic acid (mg. in 100 cc.) | 477.0 | 264.0 | Trace |

It is a matter of course that in the present invention, natural substance containing vitamin $B_1$ or similar compounds, for example, yeast extract, can be used in place of vitamin $B_1$ or similar compounds.

What we claim is:

1. A process for producing α-ketoglutaric acid by fermentation which comprises contacting a culture medium containing bacteria selected from the group consisting of the genus Escherichia, the genus Aerobacter and the genus Proteus with sufficient air to effect aerobic fermentation.

2. A process according to claim 1, wherein the culture medium comes into contact with sufficient air by aerating the culture.

3. A process according to claim 1, wherein the culture medium comes into contact with sufficient air by shaking the culture.

4. A process according to claim 1, wherein the culture medium comes into contact with sufficient air by swinging the culture.

5. A process according to claim 1, wherein vitamin $B_1$ is added to the culture medium to diminish formation of pyruvic acid as a by-product.

6. A process according to claim 1, wherein a yeast extract is added to the culture medium to diminish formation of pyruvic acid as a by-product.

References Cited in the file of this patent
UNITED STATES PATENTS 2,443,919 ------------------------------ June 22, 1948

OTHER REFERENCES

Oppenheimer-Stern: Biological Oxidation, 1939, Junk Pub., The Hague, pages 252–254.

Annual Review of Biochemistry, vol. 23, 1954, pages 33 to 35, 138.